May 12, 1931. P. L. JOSLYN 1,805,404
PISTON RING
Filed Oct. 14, 1927
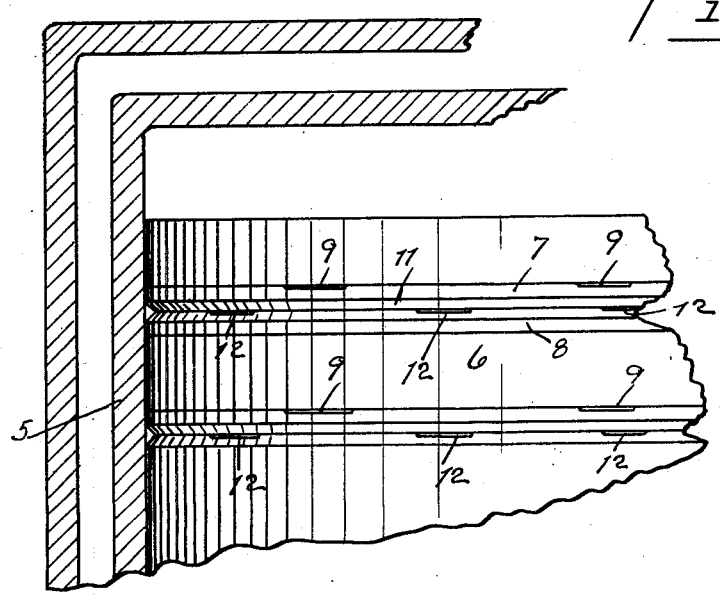
Fig. I.
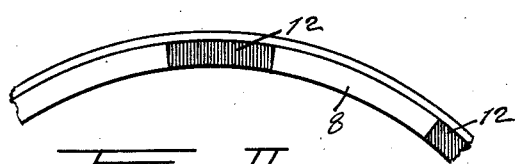
Fig. II.
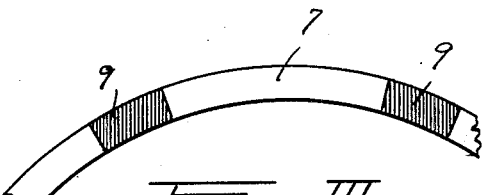
Fig. III.
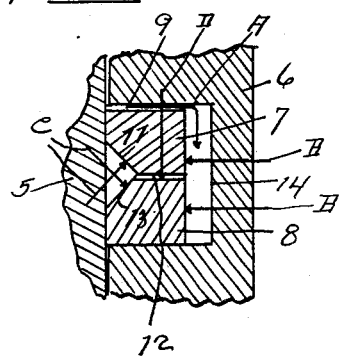
Fig. IV.
INVENTOR.
P. L. JOSLYN
BY *Victor J. Evans*
ATTORNEY.

Patented May 12, 1931

1,805,404

UNITED STATES PATENT OFFICE

PAUL LEO JOSLYN, OF SAN FRANCISCO, CALIFORNIA

PISTON RING

Application filed October 14, 1927. Serial No. 226,207.

This invention relates to improvements in piston rings and has particular reference to a piston ring for use on heavy duty engines, such as commonly termed Diesel-type engines.

The principal object of this invention is to provide a piston ring which will permit a better sealing effect and one which will reduce the amount of friction upon the cylinder walls, and at the same time, one which will provide better lubrication than is now possible with the standard form of ring.

Another object of this invention is to provide a ring wherein all of the well-known principles of piston ring construction are maintained.

A further object is to produce a ring of this character which is feasible from a manufacturing standpoint, both as to machining and cost.

Other objects and advantages will be apparent during the course of the following description.

In the accompanying drawings forming a part of this specification, and in which like numerals are employed to designate like parts throughout the same, Figure 1 is a fragmentary detail view of a piston having my rings applied thereto, Figure 2 is a fragmentary top plan view of the bottom ring section, Figure 3 is a similar view of the top ring section, and Figure 4 is an enlarged detail cross-sectional view showing the manner in which my ring will function.

In Diesel engines and other heavy duty engines, the pressures within the engine are extremely high with the result that the piston rings must fit tightly which results in excessive wear to the cylinder linings, which is brought about by the fact that poor lubrication exists, it being impossible to drive the oil past such tremendous pressures, and also taking into consideration that the gritty carbon particles further assist in this wearing-down process.

I have therefore devised a piston ring wherein a perfect seal is maintained between the piston and the wall of the cylinder, and have so devised the ring that an equalization of pressures will eliminate the excessive wear above referred to.

In the accompanying drawings wherein for the purpose of illustration is shown a preferred embodiment of my invention, the numeral 5 designates a wall of a cylinder, the numeral 6 the piston head within the cylinder.

At 7, I have shown an upper piston ring and at 8 a lower piston ring. These rings are employed in pairs, and therefore but one pair will be described, which pair consists of an upper and lower ring which are positioned in the same piston ring groove.

Referring to Figure 3, it will be noted that the ring 7 has channels 9 formed upon its upper surface and by referring to Figure 4, it will be noted that the lower edge is chamfered as shown at 11, the purpose of which will be later seen.

Referring now to Figure 2, it will be observed that the lower ring 8 is likewise provided with channels 12, the purpose of which will be later seen, and by referring to Figure 4, it will be observed that the upper edge of this ring 8 is chamfered as shown at 13.

The result of this construction is that when a pair of rings are inserted in a piston ring groove designated at 14, (see Figure 4) and the piston positioned within the cylinder, the rings will take the position shown in Figure 4.

Now assuming that the engine is working the pressure from above will pass downwardly between the cylinder wall and the piston and pass behind the ring sections 7 and 8 by passing through the channels 9 as indicated by the arrow A. This will result in an outward pressure against the cylinder wall as indicated by the arrow B. At the same time, a portion of this pressure will pass through the channels 12 into the space formed between the chamfered edges 11 and 13 and will exert pressure as indicated by the arrow C. At the same time, pressure will be exerted in the direction indicated by the arrow D. The pressure exerted as indicated by the arrow C will to a large extent, offset the pressure exerted by the arrow B, and consequently the ring will push against the cylinder wall with only its natural spring force.

The pressure exerted as indicated by the arrow D, will push the ring section 8 into intimate contact with the bottom of the groove and consequently form an effective seal provided any of the pressure should pass below the top ring of the piston. At the same time, the space formed by the chamfered faces 11 and 13 together with the cylinder wall, will form a pocket for the retention of oil with the result that the upper portion of the cylinder will be more perfectly lubricated than has been heretofore possible.

It will thus be seen that with this simple arrangement, I have provided a ring which will accomplish all of the objects herein set forth. It is to be understood that the form of my invention herewith shown and described is to be taken as a preferred example of the same, and that various changes relative to the shape, size, material and arrangement of parts may be resorted to without departing from the spirit of the invention, or the scope of the subjoined claim.

Having thus described my invention, I claim:—

In a piston ring, a pair of super-imposed ring sections, said ring sections having their abutting ends chamfered in a direction toward the outer periphery, a series of grooves formed in the upper surface of each of said ring sections, the area of the abutting surface of said ring sections, and said chamfered edges being such that pressure exerted thereagainst will balance to a substantial degree any internal pressure tending to expand said rings.

In testimony whereof I affix my signature.

PAUL LEO JOSLYN.